Dec. 4, 1945. J. N. ST. CLAIR 2,390,192
METHOD AND MEANS OF SUPPORTING ELECTRIC CABLE
Filed July 12, 1943 2 Sheets-Sheet 1
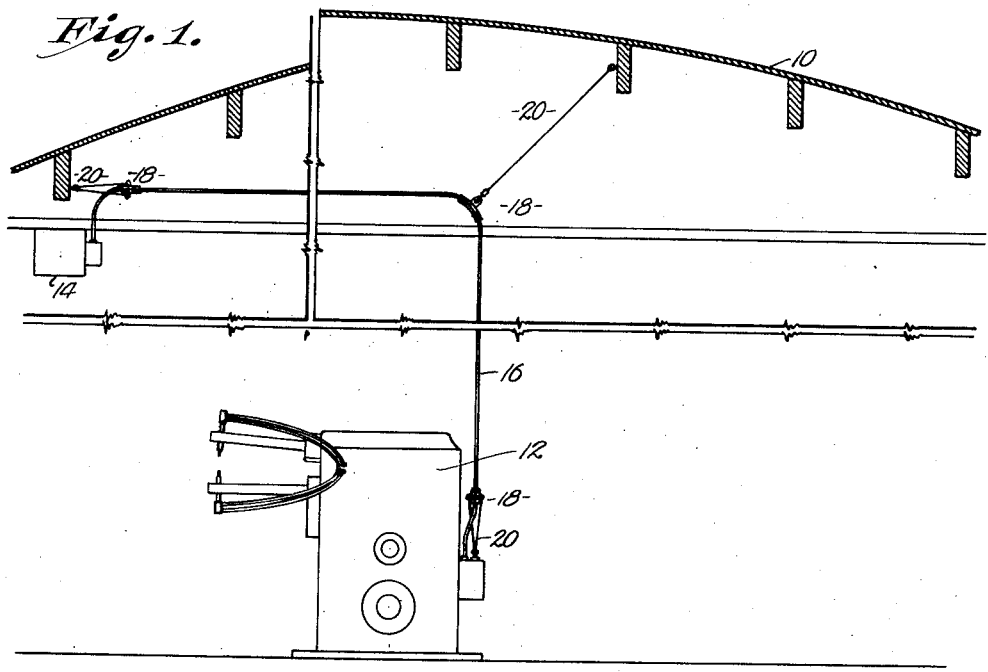
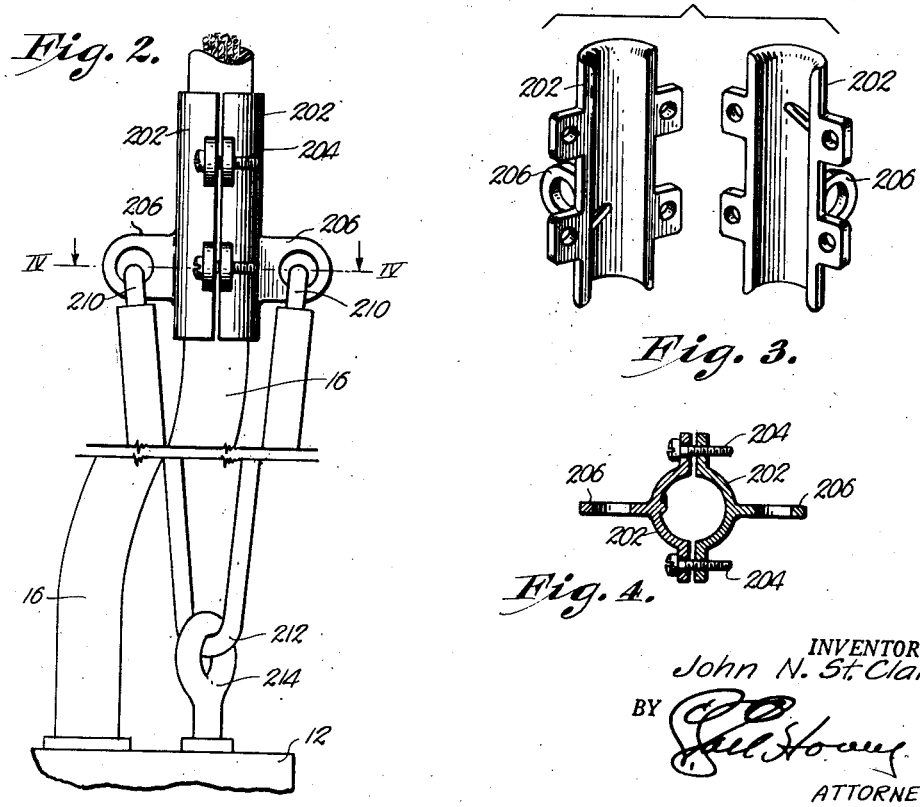
INVENTOR.
John N. St. Clair
BY
ATTORNEY.

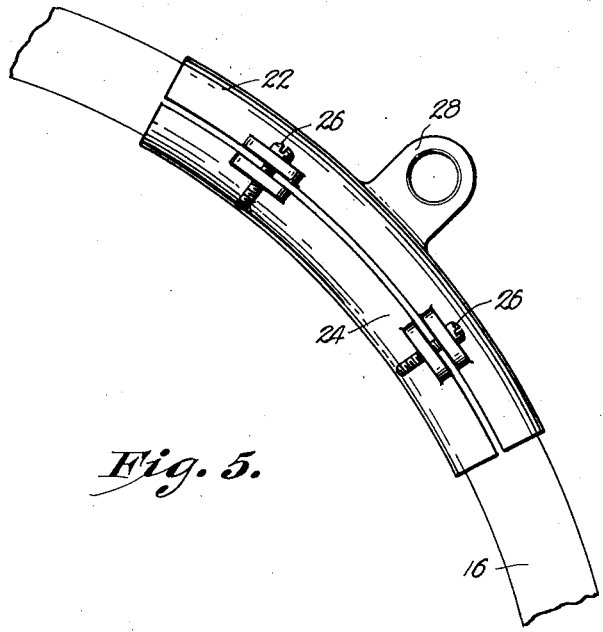
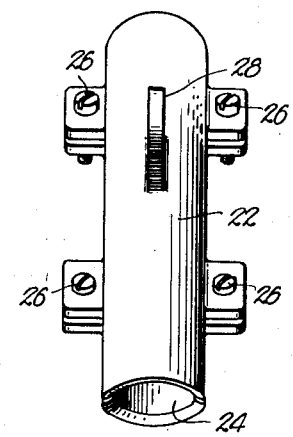
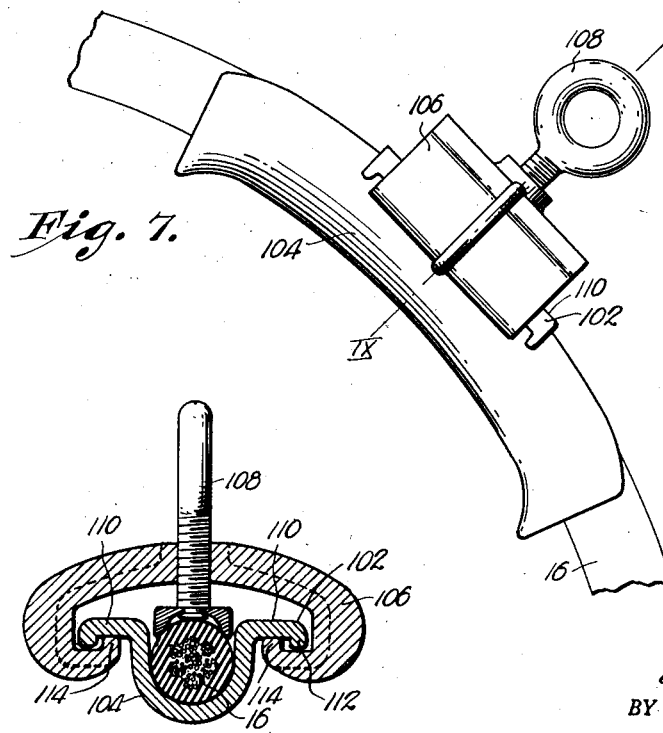
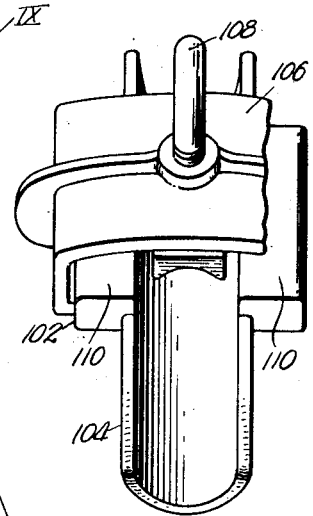
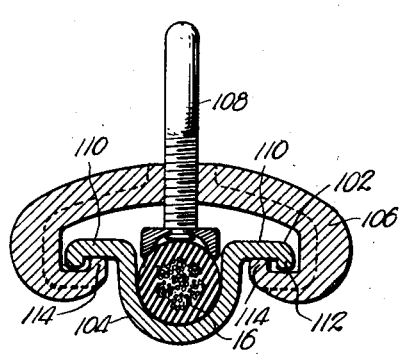
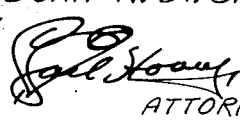

Patented Dec. 4, 1945

2,390,192

UNITED STATES PATENT OFFICE 2,390,192

METHOD AND MEANS OF SUPPORTING ELECTRIC CABLE

John N. St. Clair, Kansas City, Kans.

Application July 12, 1943, Serial No. 494,327

1 Claim. (Cl. 248—63)

This invention relates to the electrical art and particularly to a method and means of supporting electrical conductors in the nature of cables or the like which have heretofore been carried in conduit to meet the requirements of practice as developed to date.

The primary object of this invention is to provide means for supporting electric cable in operative position where the same will be desirably remote from portions of a building structure wherein the cable is suspended, without the employment of expensive, presently critical conduit.

A further aim of the instant invention is the provision of an unique, novel and effective method of quickly installing electric cable through the intermediacy of clamps and anchoring members designed to preclude the occurrence of "uncoupling" force at the ends of the cable and to suspend the cable in effective, operable and safe positions.

A still further object of the invention is the provision of supporting means for flexible electric cables which may be quickly and easily applied, relatively inexpensive to manufacture, yet embodying all of the structural details necessary to suspend a cable in a manner as satisfactory as though the same were mounted in a conduit.

Further objects of the invention will appear during the course of the following specification, referring to the accompanying drawings, wherein:

Fig. 1 is a diagrammatical view illustrating the method and means of installing flexible electric cable in accordance with the present invention.

Fig. 2 is an enlarged condensed elevational detailed view illustrating the manner of applying the clamp and anchoring member at the end of the cable.

Fig. 3 is a perspective view illustrating two elements of one form of the clamp in a separated condition.

Fig. 4 is a detailed sectional view taken on line IV—IV of Fig. 2.

Fig. 5 is a side elevational view of a clamp per se illustrating another another form thereof.

Fig. 6 is an edge elevational view of the clamp shown in Fig. 5.

Fig. 7 is a side elevational view of a clamp embodying a modified form of the invention.

Fig. 8 is an edge elevational view of the clamp shown in Fig. 7; and

Fig. 9 is a cross sectional view taken on line IX—IX of Fig. 7.

Heretofore it has been customary, and the practice of engineers to install flexible electric cable in solid conduit. Under the present circumstances, said conduit is difficult to obtain and since it is made of critical material, becomes undesirable to use because such materials are needed for the production of supplies for war.

The necessity of speed in erecting factories and the necessity of frequently shifting the position of machinery further renders the use of solid conduit for electric cables, objectionable.

With the foregoing problem in mind, the following described method and means of supporting electrical cable has been developed and accepted.

When buildings 10 are to be provided with a number of machines or the like 12, said building usually is equipped with a conduit 14 wherein is disposed the feed lines carrying current for operating machines 12. The cable 16 that is usually flexible and covered with insulating material, extends from conduit 14 to machine 12, and must be suspended so that the ends will not accidentally become disconnected. It is also necessary that cable 16 be remote from any part of building 10.

Clamps 18 are applied to cable 16 at spaced points along its length with a clamp 18 spaced from the ends of the cable, as illustrated in Fig. 1. After these clamps are applied to the cable, the same are anchored by members broadly designated by the numeral 20, to portions of building 10 or to a part of the machine 12.

Such method of insulation will fulfill the foregoing objects and present an installation capable of alteration or adjustment while all present requirements respecting safety, convenience and ruggedness, are met.

Clamps 18 are capable of adjustment and of having their component parts secured to cable 16 as installation occurs and the anchoring members are so constructed and arranged as to hold the clamps and cable in a selected position.

The form of clamp 18 illustrated in Figs. 5 and 6 embodies a plurality of separable elements 22 and 24, longitudinally arched and having means in the form of bolts or the like 26 for drawing elements 22 and 24 together and against cable 16.

An eye or analogous means 28 carried by element 22 is adapted to receive one end of an anchoring member 20, shown in Fig. 1. This form of clamp 18 is placed at points along cable 16 where the same is to be bent.

Figs. 7 to 9 inclusive illustrate a clamp made in accordance with a further modification of the invention, and while the same embodies all of the features of the clamp shown in Figs. 5 and 6, structural details thereof are not the same.

In this type of clamp, elements 102 and 104 are longitudinally arched to the desired degree as is the case with the clamp shown in Fig. 5. The means for drawing the elements 102 and 104 against the cable, is the yoke 106 and screw eye 108. Element 104 has out-turned lips 110 thereon with out-turned marginal flanges 112 cooperating to form a cavity within which the rebent edges 114 of yoke 106 are confined when the parts of this clamp are operatively assembled.

Screw eye 108 serves as the means for receiving one end of the anchor 20 as does eye 28. The ends of element 104 are beveled as are the ends of element 24 for the purpose of protecting the insulation on cable 16.

In practice the anchoring member 20 may be a wire, cable, chain, or the like, which extends from clamp 18 to some portion of building 10 that will dispose the said member on the extended median axial line between the ends of clamp 18 on which line is positioned eye 28 or 108 as the case may be. If the end of anchoring member 20 secured to building 10 is fixed and it is desired to adjust the installation at that point, members 26 or 108 may be loosened and clamp 18 moved along cable 16 to the station desired.

The type of clamp 18 which is employed near the end of cable 16 has elements 202 that embrace cable 16 and which are held against the latter through the medium of bolts or the like 204. The eyes 206 on each element 202 respectively, receive one end of anchoring member 210, which, in this instance, has its opposite end secured to a portion of the machine 12 where that end of cable 16 has its connection.

The specific manner of constructing the anchor for use with the clamp shown in Figs. 3 and 4, is illustrated in Fig. 2. This anchor is substantially V-shaped with the ends of legs 210 in eyes 206 while the bight 212 of this member is secured to a part of machine 12 by any chosen means 214.

From the foregoing it becomes apparent to one skilled in the art that the objects of this invention might be embodied in structures having widely different physical characteristics, and that the clamps and anchors may be installed to effectively displace conduits heretofore used.

Having thus described the invention, what is claimed as new and desired to be secured by Letters Patent is:

Supporting means for flexible cable comprising a pair of separable elements formed to circumscribe the cable when operably mounted thereon and to establish a bend in the cable; a flexible anchoring member extending an appreciable distance from the clamp to a point of attachment for one end thereof on a supporting structure; and a clamping member on one of the elements for receiving the opposite end of the flexible anchoring member, said member being adapted to hold the pair of separable elements in their operative position with respect to each other and with the cable, the member being disposed on a medial transverse line of the pair of elements and projecting outwardly from the convex side of the bend formed in the cable whereby the support of the anchoring member is evenly distributed along the cable at the bend therein when the anchoring member is in alignment with the axis of the clamping member.

JOHN N. ST. CLAIR.